United States Patent [19]
Ausnit

[11] 3,853,671
[45] Dec. 10, 1974

[54] APPARATUS FOR MAKING MULTIPLE PLASTIC BAGS WITH RECLOSABLE FASTENER THEREON

[76] Inventor: Steven Ausnit, 124 E. 61st St., New York, N.Y. 10021

[22] Filed: July 25, 1972

[21] Appl. No.: 275,063

[52] U.S. Cl................. 156/580, 24/201, 156/66, 156/73, 161/48
[51] Int. Cl..... A44b 17/00, B32b 7/08, B29c 27/08, B23k 29/00
[58] Field of Search...... 24/201 C; 156/66, 73, 580, 156/583; 150/3; 53/40; 161/48

[56] References Cited
UNITED STATES PATENTS

| | | | |
|---|---|---|---|
| 3,106,941 | 10/1963 | Plummer | 24/201 C |
| 3,172,443 | 3/1965 | Ausnit | 24/201 C |
| 3,202,559 | 8/1965 | Laguerre | 24/201 C |
| 3,226,787 | 1/1966 | Ausnit | 24/201 C |
| 3,246,672 | 4/1966 | Naito | 24/201 C |
| 3,554,822 | 1/1971 | Schwarzkopf | 156/66 |
| 3,752,718 | 8/1973 | Potin | 156/73 X |

*Primary Examiner*—Philip Dier
*Attorney, Agent, or Firm*—Hill, Gross, Simpson, Van Santen, Steadman, Chiara & Simpson

[57] ABSTRACT

A mechanism and method for making material for multiple plastic bags with reclosable fasteners thereon, including either continuously supplying a flattened plastic film tube and cutting a strip from the front wall to expose the rear wall or supplying a flattened film sheet and folding back both ends so as to leave a central exposed section and applying a rear fastener strip to the rear wall or exposed section of the film and applying front fastener strips to the edges of the front wall or folded ends of the film, positioning an anvil within the film and simultaneously applying high speed continuous heat sealing means such as ultrasonic sealing horns to the web portions of the fastener strips and film to form a seal, and thereafter joining the front fastener strips to the rear fastener strip and rolling the material on a supply roll for later cutting the bags down the center of the rear fastener strip, or else continuously supplying a flat film sheet and guiding one or more sets of fastener strips to the surface of said film sheet, positioning an anvil below said film and simultaneously applying high speed continuous heat sealing means, such as an ultrasonic sonic process, to the surface of the web portions of the fastener strips and film sheet to form a continuous seal, and joining and cutting between the fastener strips as required, and cross cutting the assembly to form a series of bags.

14 Claims, 17 Drawing Figures

PATENTED DEC 10 1974 3,853,671

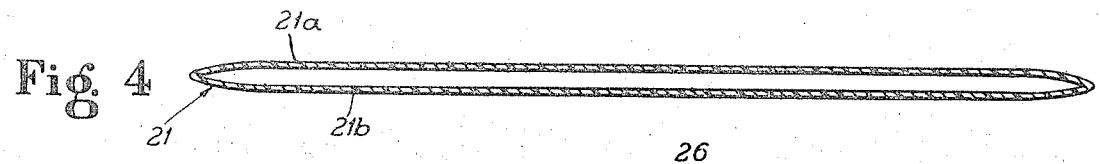
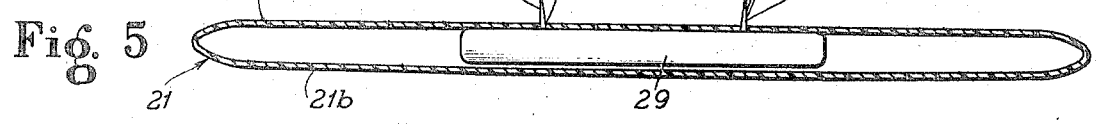
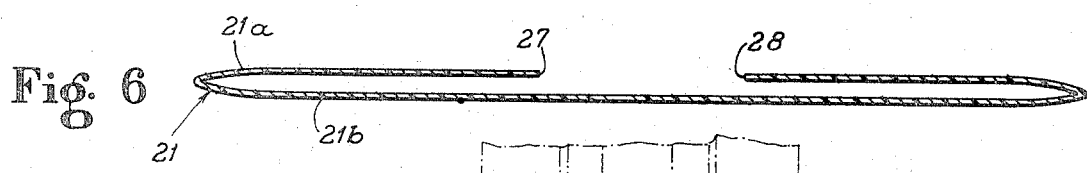
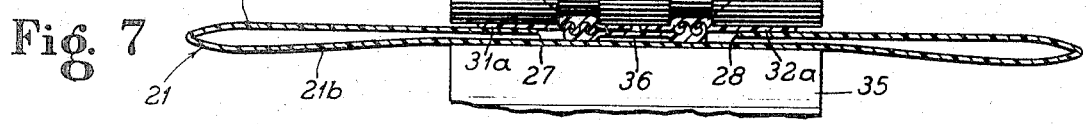
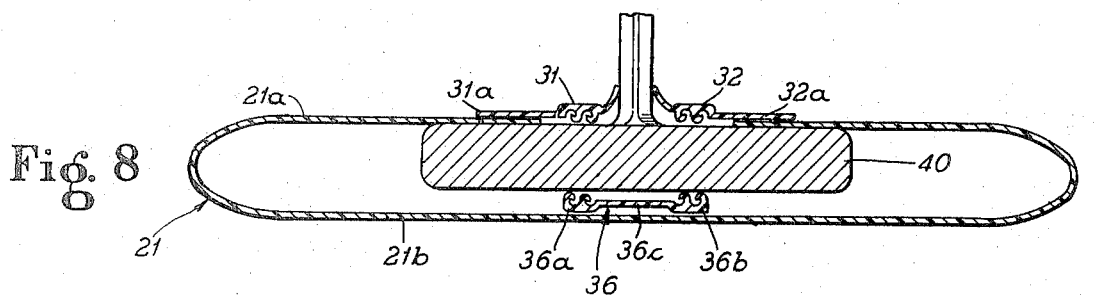
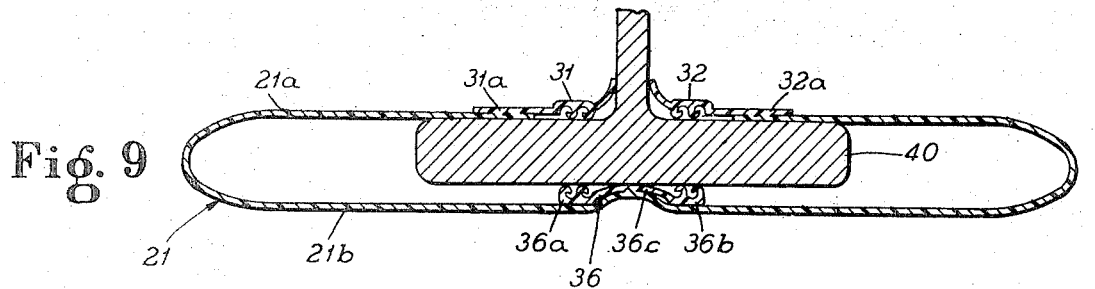

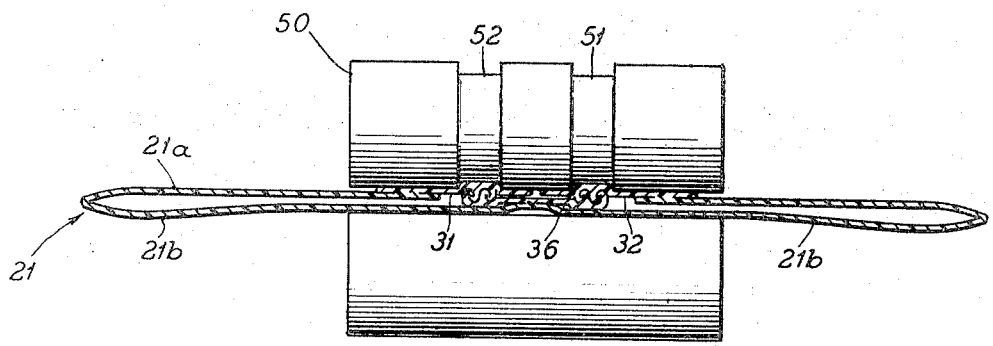
Fig. 10
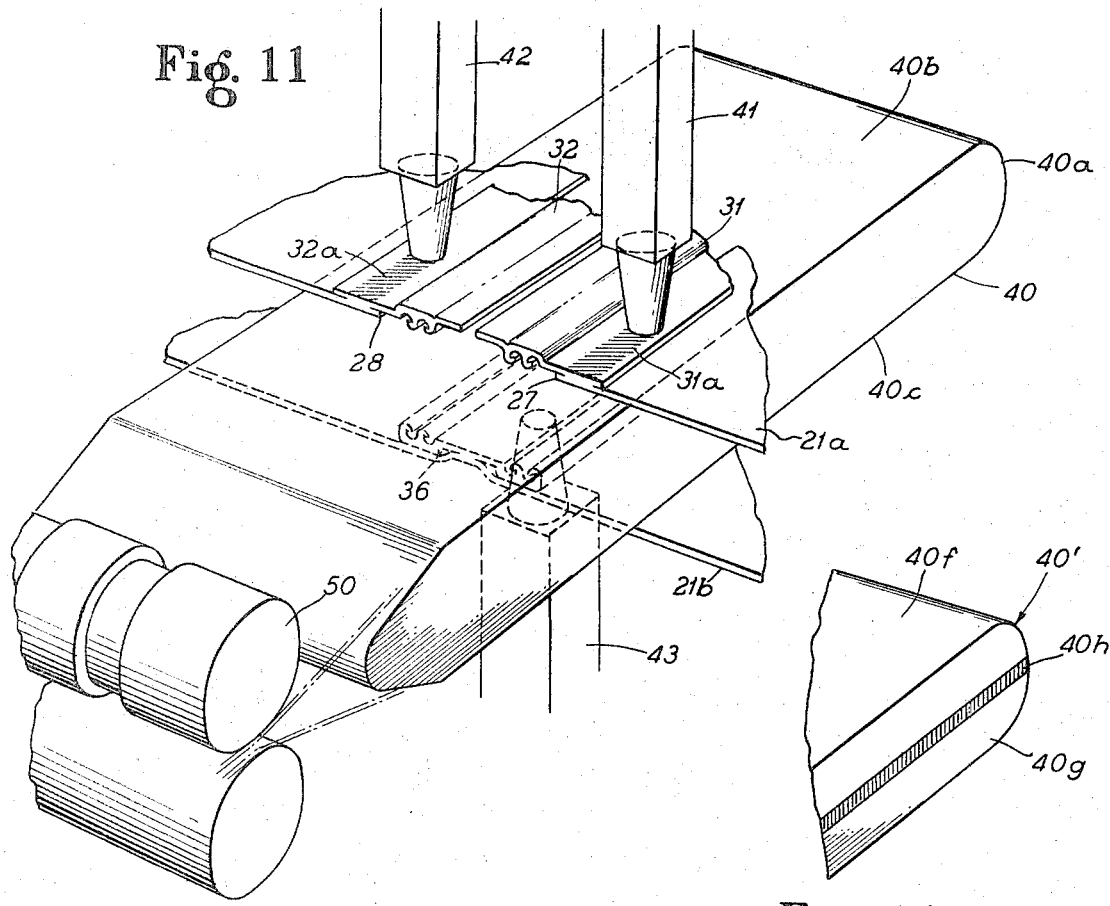
Fig. 11
Fig. 14

APPARATUS FOR MAKING MULTIPLE PLASTIC BAGS WITH RECLOSABLE FASTENER THEREON

BACKGROUND OF THE INVENTION

The present invention relates to improvements in methods and mechanism of forming material which is used for making multiple bags. More particularly, the invention relates to a method and mechanism for arranging and handling the film and the strip for the fasteners for the bags and for joining the fastener strips to the film by high speed continuous heat sealing means such as by an ultrasonic sealing process in an improved manner which forms an improved bag and which is capable of continuous fast production operation, that can be used in conjunction with extrusion operations.

In the formation of plastic film bags of the type referred to, the bags are of plastic film and usually formed with a folded bottom edge and with side edges sealed to each other. Flexible reclosable plastic fastener strips are sealed to the top edges of the bags thereby providing a reclosable sealable bag unit.

The fastener strips may take various forms such as shown in U.S. Pat. No. 2,780,261, Svec et al.

In the manufacture of bags such as illustrated in the above Svec et al Patent, the bag bodies are formed of a thin lightweight plastic film which is extruded separately from the fastener. The fastener strips are extruded of a material and with a process that provides interlocking rib and groove elements carefully shaped and sized so that they will interlock when pressed together and will separate when pulled apart by opening flanges. These strips have web portions which are sealed to the film of the bag. It has been discovered that the bags in question can be manufactured by a multiple operation, that is, the material for making the bags can be formed so that two bag bodies project from a center assembly of the fastener strips. By cross cutting and seaming across the length of the material made, two bags are formed simultaneously. Since the overall cost of the completed bags is a function of the speed at which they can be manufactured, it is important that the length of material from which the bags are to be made can be made smoothly and rapidly at production rates of speeds, and in a reliable fashion. Improper joining of the fastener strips to the film of the bag will result in leaks in the bag, and in bags that will not properly close or cannot be reopened due to distortion of the fasteners because of misalignment. Also the amount of heat for joining the fastener to the bag wall will have an effect on the seal. If insufficient heat is applied, the seal will be inadequately formed so that the bag will leak, or the fastener web will peel away from the film to which it is attached. If too much heat is applied, the plastic will melt away so that there may be holes in the wall of the bag as mentioned above. It is also important for the fastener strips and the bag film to be accurately oriented with respect to each other. If the film is not properly positioned relative to the web portion of the fastener strips, a good seal may not result, and projecting raw edges of plastic on the inside of the bag can form crevices in which the contents of the bag will be caught, or if on the outside of the bag, said edges will tend to be torn apart by the user of the bag who will mistake these edges for the fastener opening lips. In the described form of manufacture, the fastener and the film are made separately by an extrusion process and then joined together shortly thereafter in an in-line process featuring continuous heat sealing of the strip to the film. Heretofore, fastener bags were made in an operation which required, in addition to the cross seal, attaching the fastener to the film during the bag making operation by intermittent overlapping sealing of the fastener web to the film, which in turn, cut down on the speed of the operation and reliability of the fastener seal. This was because each seal cycle first required a build up of heat and then a cooling of the seal formed before the operation could be repeated. This prevented the fastner and the film from being attached together continuously as they were being extruded.

Additionally, the heat could never be closely controlled since it was, as indicated, continuously varying through its cycle. Under the present invention, once the optimum extrusion speeds have been reached, the heating means required for joining the fastener to the film can be set and maintained within a fairly accurate degree. The system described also has an advantage over methods of making a film and fastener integrally in that it allows the use of the most desirable resins for the film, where clarity and strength are required, and for the fastener where sufficient slip and contour forming are required. Generally, the characteristics of the resins required for the fastener are not the same as those required for the film and integral fastener film constructions usually result in a compromise. Furthermore, by extruding the fastener and the film separately, the most desirable extrusion process and cooling and control can be used for each one, thereby increasing the speeds at which each can be manufactured over that at which they can be manufactured integrally.

Accordingly, one of the best ways of making reclosable fastener bags is to be able to join the fastener and the film together as they are being separately extruded, on a continuous reliable basis, and later converting the fastener film into the bags themselves. After joining of the strip to the film, the material is placed on a roll for shipment to a converter, who in turn, forms bags by cross cutting and sealing. It is essential to the original manufacturer of the material that it be properly made so that the material can be rolled and stored.

It is accordingly an object of the present invention to provide an improved mechanism for forming continuous material for making fastener bags which is capable of operating at extrusion production speeds and producing bag material which is accurately and reliably made.

Another object of the present invention is to provide a mechanism for continuously forming material for making multiple bags, which can operate at extrusion production speeds eliminating the possibility of forming melted holes in the plastic and insuring positive and optimum attachment between the bag film and fastener strips.

Still another object of the invention is to provide a mechanism which will untilize tubular film or folded sheet film or flat sheet film and will attach front and rear fastener strips for bags by simultaneous continuous production operation.

Other objects, advantages and features, and equivalent structures within the scope of the invention will become more apparent to those skilled in the art in connection with the teaching of the principles thereof in the specification, claims, and drawings in which:

DESCRIPTION OF THE DRAWINGS

FIGS. 4 through 10 are vertical sectional views taken through the mechanism of FIG. 2 at different stages along the machine at the locations indicated by the corresponding Roman numeralled sections lines in FIG. 2;

FIG. 11 is a perspective view of a portion of the structure of FIG. 2;

FIG. 14 is a fragmentary perspective view illustrating a modified form of anvil which may be employed;

DESCRIPTION OF THE PREFERRED EMBODIMENTS

Figure 1:
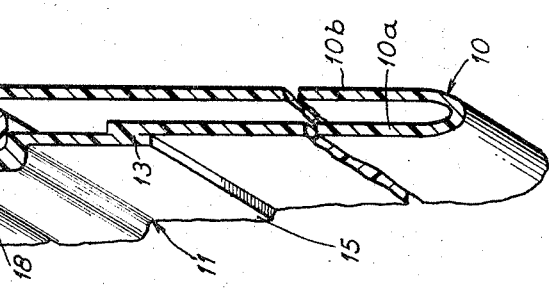
FIG. 1 is a perspective view with portions broken away of a bag of the type made from material for making reclosable fastener bags.

FIG. 1 illustrates a bag of the type which is formed from material made on the mechanism and with the method of the present invention. The bag is the ultimate end product, and the continuous material for making bags is often first manufactured and then rolled on a roll to be made into bags by a final operation at a bag making shop. The bag has a lower bag body portion 10 of thin pliable plastic film such as polyethylene or other suitable plastic. Attached at the upper edges of the bag are fastener strips 11 and 12. The front fastener strip 11 is attached to the upper front wall 10a of the bag by a heat seal at 13, and the rear fastener strip 12 is attached to the upper edge of the rear wall 10b at 14 by a heat seal. References will be made herein to "front" and "rear" for identifying the location of walls of the bag and also to "upper" and "lower" for identification of parts of the fastener strips, but it will be understood that in the operation of the machine, the bag material may be handled in different positions, and the reference to locations is to be considered as relative to the other positions of the machine, and these terms are not intended to be limiting in the specification or claims. Also, the fastener strip 11 may have a different configuration as in FIG. 15.

The front or upper fastener strip 11 has a web portion 15 by which it is attached to the front wall 10a of the bag. The rear or lower fastener strip 12 has a web portion 16 by which it is attached to the upper edge of the rear wall 10b of the bag. The front fastener strip also has a thickened marginal portion 18 which carries ribs and grooves to interlock with mating ribs and grooves in the thickened marginal portion 17 of the rear fastener strip.

In accordance with the method employed in making bags with the preferred structure of the present invention, a continuous length of material is produced which contains bags on each side so that it is cut down the center to separate the bags. To form the bags themselves, an end is cross-cut from the length of material, and as the edges are severed, a seam is also formed for the bag. The appearance of the length of material with the fastener joined, from which dual bags are simultaneously formed by crosscutting and sealing, is shown in FIG. 10. This construction is also shown in U.S. Pat. No. 3,219,084, Ausnit et al.

Figure 2:
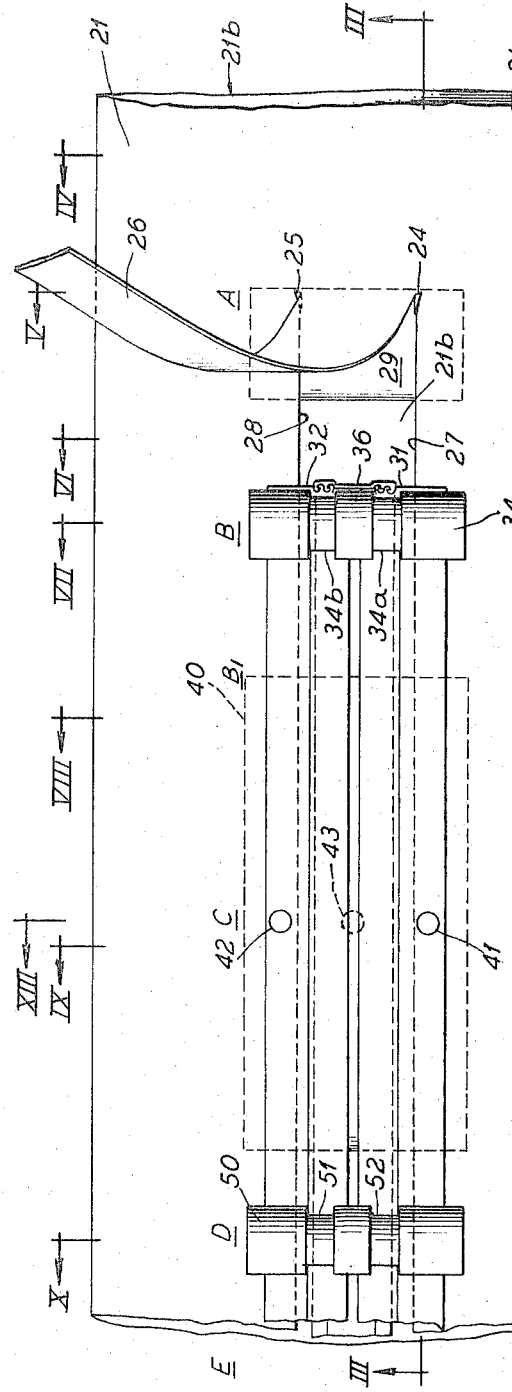
FIG. 2 is a somewhat schematic top plan view of a mechanism for making bag material embodying the principles of the present invention.
Figure 3:
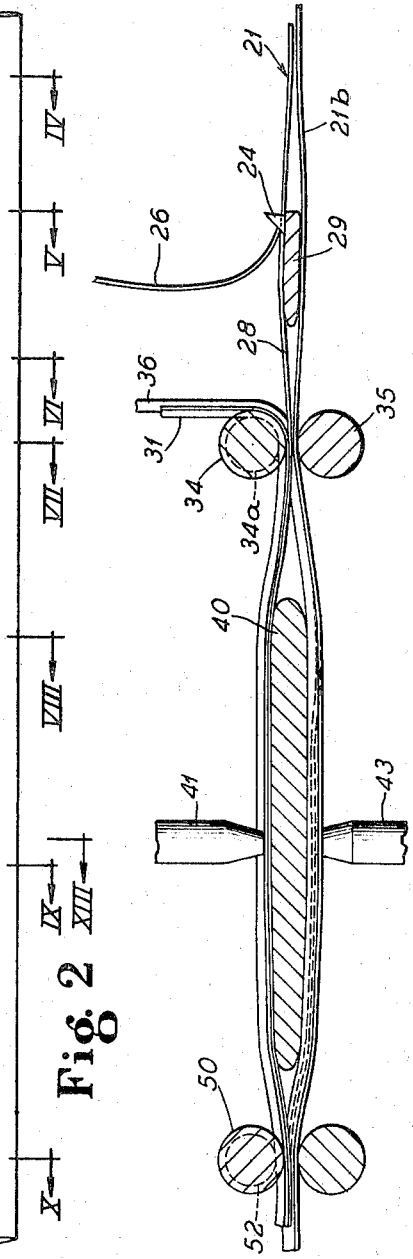
FIG. 3 is a vertical sectional view taken substantially along line III—III of FIG. 2.

As shown in FIG. 2, a continuous length of plastic tubing 21 is fed into the machicne, such as from a supply roll or from an extruder. The tubing is a thin, lightweight plastic which will form the bodies of the bags. FIG. 2 is looking down upon the mechanism, and the various anvils and parts are supported by suitable frame mechanism which is omitted for the sake of clarity.

The tubing first passes a slitting station at which are located spaced knives 24 and 25, as in FIG. 5. These knives cut a strip 16 from the center of the upper wall 22 of the tube so as to leave a slot as in FIG. 6. The strip 26 which is removed leaves cut edges 27 and 28 which form the upper edges of the front walls of the opposed bags. To these edges will be attached the front or upper fastener strips. The strip 26 which us cut from the tubing is discarded. In some arrangements it may be desired to cut a single slit in the tubing and to separate the edges formed thereby to form the open slot as illustrated in FIGS. 2 and 6. In other arrangements, a flat sheet may be taken and folded at either end to yield a configuration as illustrated in FIG. 6. In yet another arrangement, the fastener strips can be applied to the surface of a flat sheet as in FIG. 15.

The slitting knives 24 and 25 are carried on a suitable mandrel such as shown at 29 and will function to continuously cut the tube 21 which is moved over the mechanism, such as by being pulled forwardly at a continuous rate of speed by take-up roll, not shown, upon which the completed material is wound, which roll is located at the take-up station E. As the tubing passes through the machine, it first passes the slitting station A, next a lay-on station B where the upper fastener strips are laid over the edges of the tubing, then a separating station $B_1$ where the upper fastener sections are separated from the lower fastener section, and next passes a sealing station C where the edges of the fastener strips are continuously attached to the edges of the film, thereafter it passes a joining station D where the fastener strips are interlocked, and thence it passes to the take-up station E where the completed material is wound up.

At the lay-on station B is a guide or positioning roll 34 positioned above the tubing and having annular channels 34a and 34b which guide the upper fastener profile strips 31 and 32 into place over the edges 27 and 28 of the material. The profile fastener strips are positioned so that their web edges 31a and 32a, FIG. 7, overlay the edges 27 and 28 of the plastic film. Accurate orientation is necessary in the present instance inasmuch as the web portions are sealed to the film by continuous heat sealing means such as with ultrasonic heads which are capable of forming a sealing operation without inadvertently placing holes through the plastic. The seam formed between the marginal portions of the fastener strips and the film can be carried completely to the edges of both the film and web portion so that the full area of overlap can be employed for the seal. This avoids projecting unbonded edges above or below the seam as can occur if the seal does not cover the entire area of overlap.

Beneath the film is a supporting roller 35, and the rollers 34 and 35 rotate at the speed of travel of the moving film.

Also fed over the positioning roll 34 is a lower fastener strip which is attached to the lower portion 21b of the film. The back fastener strip 36 passes down through the opening between the edges 27 and 28 in the film and is laid down against the lower portion 21b of the film as shown in FIGS. 7 and 8. This back fastener strip 36 has profiles 36a and 36b at the edge, and a web portion 36c in the center. This web portion 36c will be welded to the lower wall 21b of the film with a broad seal, and when the bags are formed, a cut will be made in the center of the seal so that one-half of the strip 36 will go with each bag.

The film is then passed over and under a main anvil 40 which has upper and lower support surfaces for the film. The web portions of the upper closure strips 31 and 32 and the edges of the upper film walls 27 and 28 pass between the continuous heat sealing means 41 and 42 and the anvil upper support surface to be sealed together. Beneath the anvil 40 is another continuous heat sealing means 43 which seals the fastener center web portion 36c to the center of the lower film wall 21b. The seams formed are shown beneath the marginal portions 31a and 32a, and beneath the marginal portion 36c as in FIG. 9.

Various sealing mechanisms may be used. One form which can be used is an ultrasonic sealer and the structure will be described as employing this type of sealer. Each of the continuous heat sealing means 41, 42 and 43, if it uses ultrasonic means, has a head or horn operated by a sonic converter which receives power from a power supply. The head may be in the form of a horn which can move downwardly to engage the overlapped portions of the plastic. The application of utrasonic force through the horn is supplied for a sufficient fraction of length of time to induce fusion between the surfaces of the layered material, and they are held in that relative position for a sufficient fraction of time until the plastic has solidified adequately to maintain the portions in their relative positions. The power supply converts conventional 60 cycle per second electrical energy to 20,000 cycle per second energy. The 20,000 cycle per second is chosen as optimum, but higher frequencies may be employed. A control is provided to regulate the frequency and energy application to the film and to the web portion of the fastener strip. As the speed of the film is increased or decreased, the frequency may be increased or decreased and maintained at an optimum range so as to allow uniform and complete formation of the ultrasonic seal between layers. The power supply feeds the 20,000 per second electrical energy to the sonic converter which converts the electrical energy to mechanical vibrations at the same frequency in the horn. The horn is placed into contact onto the plastic layers, holding them against the anvil, and the vibrations travel through the plastic to the boundary between the surfaces of the layers where they are joined. At the location of the surfaces between the layers, the intense vibrations of one surface moving against the other causes sufficient frictional heat to create fusion of the plastic with the material staying under the horn and in contact therewith the fraction of time long enough for the fusion to take place.

With the arrangement, the plastic layers can be of different thicknesses, as they probably will be with changes in thickness of film and retention of the same thickness of web portion of fastener strip. Also, since the heat is generated between the surfaces of the layers themselves, they can be welded up to their extreme edges. Since the energy transmitted to the plastic can be controlled by accurately controlling the frequency of the ultrasonic vibrations, immediate control can be obtained relative to the speed of travel of the film which is an overall controlling factor.

The film after leaving the separating anvil next passes to station D where the front fastener strips 31 and 32 are pressed into interlocking engagement with the rear fastener strip 36 as in FIG. 10. For this purpose a joining and guide roll presses down upon the strips to interlock their rib and groove elements. The roll 50 has annular channels 51 and 52 which align the fastener strips 31 and 32 and press them into interlocking engagement.

FIG. 11 shows the anvil 40 in greater detail. The anvil has a rounded leading nose end 40a which is smoothed to insure separation of the lower fastener strip from the upper fastener strips 31 and 32. The anvil has a smooth upper surface 40b to support the film, and the fastener strips 31 and 32 thereon, so that the continuous heat sealing means 41 and 42 can engage the web portions 31a and 32a and the film edges 27 and 28 to form the continuous heat seal. Similarly, the lower suface 40c of the anvil is smooth so that the sealing means 43 can form its seal, sealing the lower film to the web portion 36c of the lower fastener strip 36.

Should ultrasonic means be used for sealing inasmuch as such seals are formed by the transmission of vibrational energy, anvil 40' shown in FIG. 14 is separated so that it has an upper part 40f and a lower part 40g. These parts are separated by sound deadening material 40h.

Figure 12:
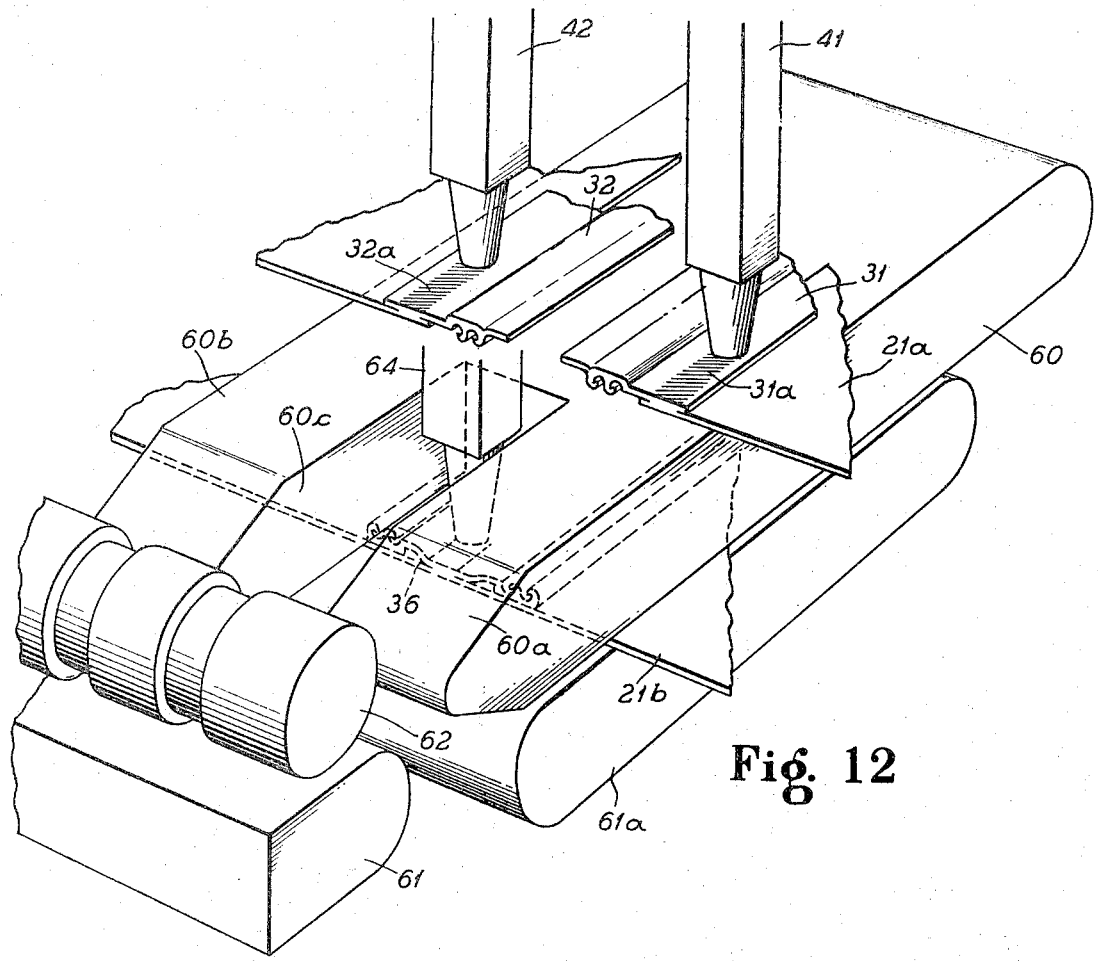
FIG 12 is another perspective view illustrating another form of the invention.

FIG. 12 illustrates another form of anvil. In this anvil 60, a continuous heat sealing means 64 fastens the lower fastener strip 36 to the lower film 21b by extending downwardly from the top and engaging the film and strip between itself and a lower anvil 61a. To accommodate this, the anvil 60 is provided with a recess in its trailing edge so that projecting portions 60a and 60b have a recess 60c between them into which the continuous heat sealing means 64 extends. The lower anvil 61a also supports the film, and a shoe 61 is positioned beyond the anvil 60 and below the fastener strip joining roll 62 which presses the fastener strips together, between shoe 61 and the joining roll 62. The lower anvil 61a and plate 61 can be made in one piece.

Figure 13:
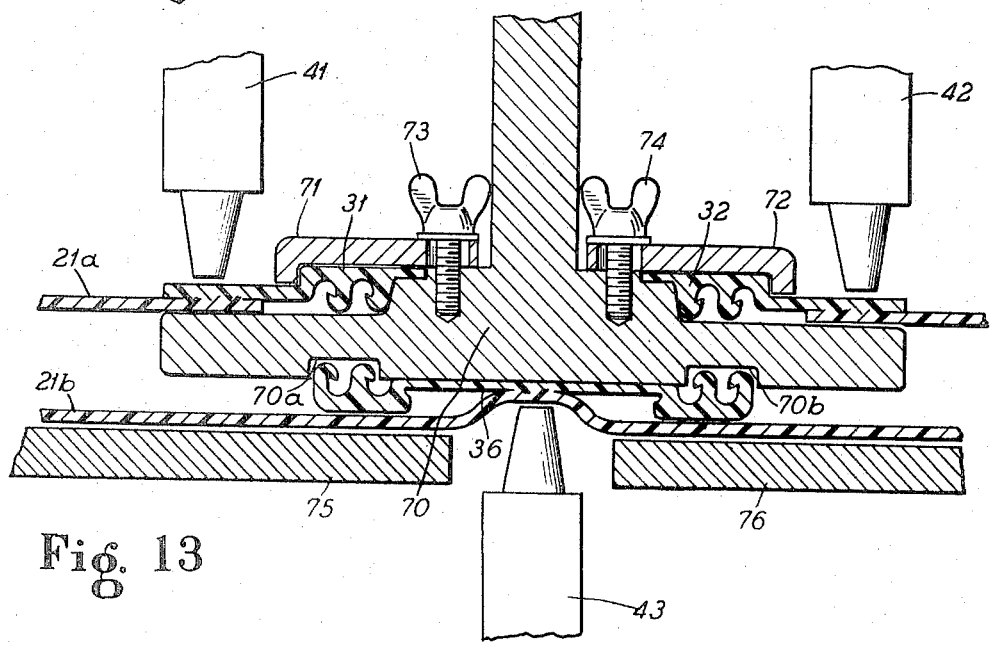
FIG. 13 is a vertical sectional view taken at the location of XIII—XIII of FIG. 2 and illustrating another form of the invention.

In the structure shown in FIG. 13, an anvil 70 is provided which has guides for additionally guiding the fastener strips. in the lower surface of the anvil 70 are grooves 70a and 70b for the fastener portions of the fastener strip 36. Plates 75 and 76 beneath the anvil help support the film 21.

At the upper side of the anvil are L-shaped guide strips 71 and 72. These are held on the anvil by thumb screws 73 and 74, and provide channels for the fastener portions of the strips 31 and 32. These channels hold the strips accurately in place maintaining accurate orientation for the continuous heat sealing mens 41 and 42.

Figure 15:
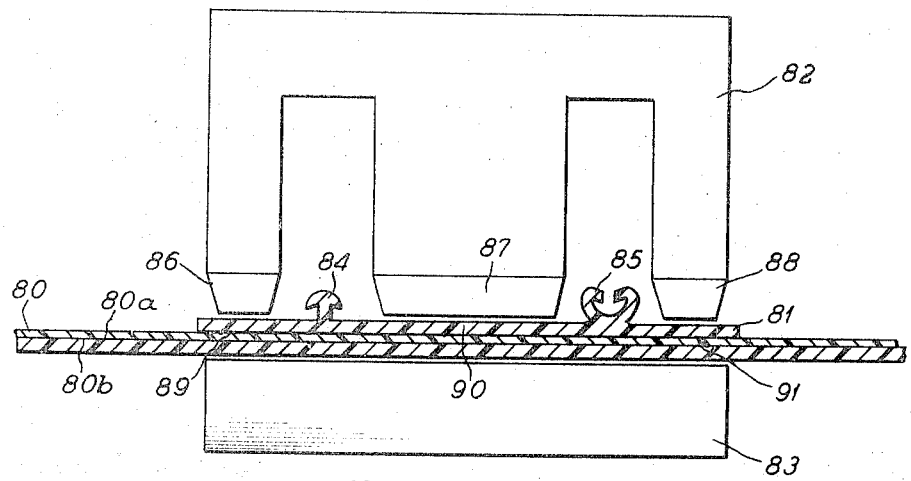
FIGS. 15 and 16 are cross-sectional views illustrating a form of the invention which uses a flat sheet film and fastener of slightly different construction.

FIG. 15 illustrates an arrangement wherein a sheet instead of a tube is used. It will, of course, be understood that the principles of the Figures decribed earlier herein may also be used with a flat sheet so that sides of the sheet are folded inwardly with the edges being at 27 and 28 in FIG. 2, instead of cutting a strip from a tube. Also, instead of cutting a strip from a single slit may be formed with the sides of the slit spread.

In FIG. 15, the flat sheet is shown as a laminated unit having plural layers with an inner layer 80a and an outer layer 80b. The outer layer may be a rough protective sheet, and the inner layer 80a may be of plastic so as to provide air-tightness to the bag unit. A strip 90 having shaped releasably interlocking fastener profiles 84 and 85 thereon is attached to the laminate sheet 80. The sheet is fed continuously through a mechanism as illustrated in the previous drawings, but with an anvil 83 beneath the sheet and sealing horns 86, 87 and 88 above the sheet. These horns may be ultrasonic sealers or sealing mechanisms of other contructions, and form a continuous heat seal between the strip 90 and the sheet 80. The seals are formed at 89, 90 and 91 as the sheet and strip are fed through the machine in a continuous process.

Figure 16:
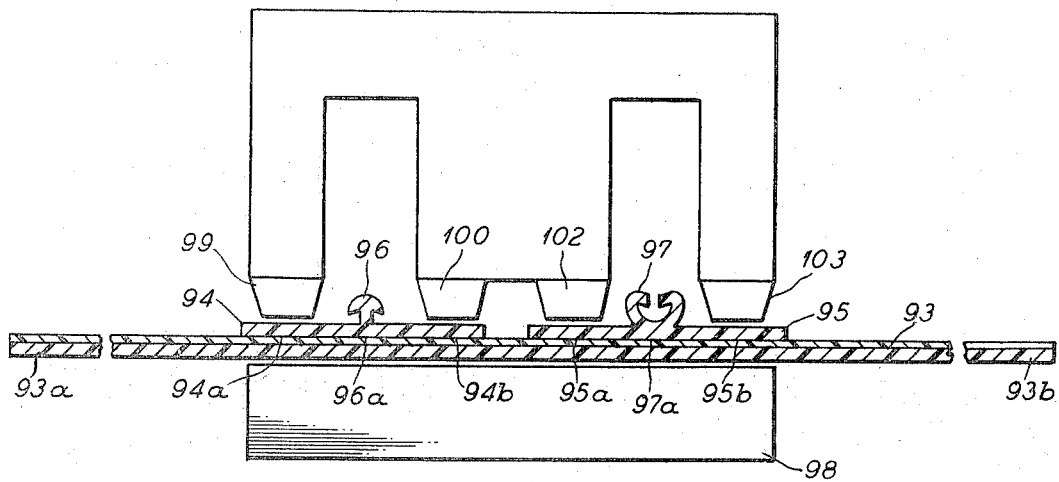

In the arrangement of FIG. 16, a multiple layered laminate sheet 93 is provided, but the interlocking profiles are carried on separate strips. That is, strips 94 and 95 are laminated to the sheet. The strips have a male profile 96 and a female profile 97 respectively thereon.

As the sheet 93 with the strips positioned thereon is fed through the machine in a continuous operation, sealing horns 99, 100, 102 and 103 seal the strips to the sheet 93. Seals are formed at 94a and 94b for the strip 94, and at 95a and 95b for the strip 95. The sealing horns may be ultrasonic sealers, or may be other forms of sealing units, and apply a sealing pressure with the sheet being supported on the anvil 98 below the sheet. The sheet is then folded at 106 with one side brought over as shown by the arrowed line 109, and individual bags are formed by cross-sealing and cutting the folded sheet.

Figure 17:
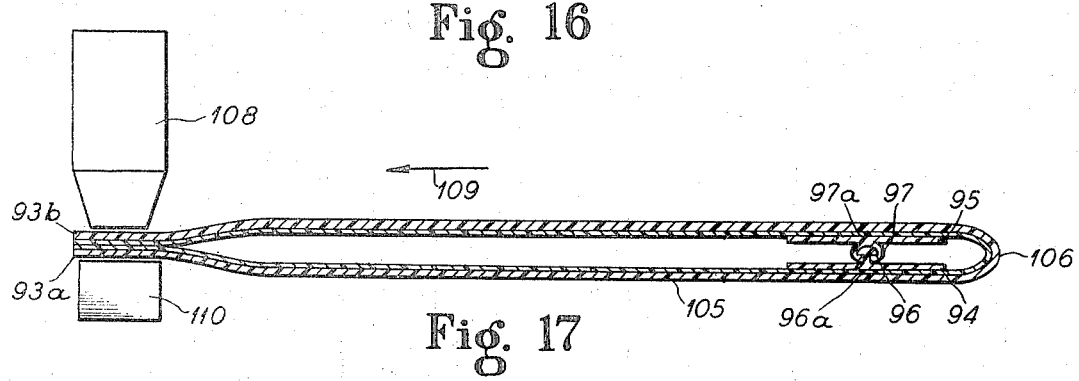
FIG. 17 is a cross-sectional view illustrating a step in the completion of the bag formed as illustrated in FIGS. 15 and 16.

The bottom edges remain separated after cross-sealing and cutting, and the bag is then filled with the product it is to contain. Thereafter to complete the bag, the ends of the sheet 93a and 93b are brought into registry in the manner shown in FIG. 17, and are heat sealed together by a sealing means 108 against a plate 110.

It is to be noted that an improved bag construction results from the method and sealing structure shown in FIGS. 15 and 16. In this bag construction the profile elements are carried on separate strips, and the strips are attached to the bag over an area which does not extend beneath the profile. That is, the areas 96a and 97a of FIGS. 16 and 17 directly beneath the profile, are not attached to the material of the bag. This will permit an additional bending flexibility in the stem of the male profile 96 and in the base of the female profile 97 which helps prevent them from being disconnected due to normal twists and stresses and strains on the bag. The flexible profile strips 94 and 95 act as additional hinges over the small area directly at the base of the profiles where they are unattached. Yet, the profile strips are firmly and fully attached to the bag so that no leakage can occur.

I claim as my invention:

1. A mechanism for making multiple plastic bags with reclosable fasteners thereon comprising:

means for continuously supplying flat tubular plastic film;

means for forming a continuous opening in the upper layer of the film with the edges of the opening forming the upper edges of front walls of bags to be made from the film, the portion beneath the upper bag edges forming the rear wall of the bags;

means for feeding a rear continuous fastener strip having a web portion between the edges through the opening and against the rear wall of the film;

means for accurately positioning web portions of first and second front fastener strips against said upper bag edges of the film portion;

first and second continuous high speed heat sealing means attaching said web portions of said first and second strips to the film;

and third continuous high speed heat sealing means attaching the web portion of the rear strip to the rear wall of the film.

2. A mechanism for making material for multiple plastic bags with reclosable fasteners constructed in accordance with claim 1 wherein said continuous heat sealing means is in the form of ultrasonic plastic sealers.

3. A mechanism for making material for multiple plastic bags with reclosable fasteners comprising means for supplying plastic film having a continuous portion for forming the rear wall of bags and having edge portions extending toward each other over said continuous portion for forming the upper edges of front walls of bags;

means for positioning a rear continuous fastener strip having a center web portion between said edge portions and against the rear wall;

means for positioning web portions of first and second front continuous fastener strips respectively against said first and second edge portions;

at least two continuous heat sealing heads positioned for continuous joining of the web portions of the front fastener strips to said upper bag edges and a third heat sealing head for joining the web portion of the rear fastener strip to the rear wall portion of the film; and means for moving said film continuously past said heads.

4. A mechanism for making material for multiple plastic bags with reclosable fasteners in accordance with claim 3 wherein said front and rear heat sealing heads are in opposing relationship and an anvil is positioned therebetween.

5. A mechanism for making material for multiple plastic bags with reclosable fasteners constructed in accordance with claim 3 and including an anvil positioned so that the film passes thereover, and said sealing heads including ultrasonic sealing horns opposite the web portion of the fastener strips sealing the web portion to the film against said anvil.

6. A mechanism for making material for multiple plastic bags with reclosable fasteners constructed in accordance with claim 3 and including a main anvil positioned to be located beneath said edges of the front wall of the film, an opening in the anvil intermediate the side edges thereof, a lower anvil beneath the back wall portion of the film opposite said opening, said sealing heads including an ultrasonic sealing means including a pair of horns for sealing the web portions of the front fastener strips to the edges of the front film wall against the main anvil and including a horn engagable with the web portion of the rear film through said opening and sealing said web portion of the rear fastener strips to the rear wall of the film against said lower anvil.

7. A mechanism for making material for multiple plastic bags with reclosable fasteners thereon constructed in accordance with claim 6 and including a pair of rolls positioned downstream from said anvil pressing the front fastener strips against the rear fastener strips to interlocking engagement.

8. A mechanism for making material for multiple plastic bags with reclosable fasteners constructed in accordance with claim 6 and including a roller positioned to coact with said lower anvil for pressing the front wall fastener strips against the rear wall fastener strip to interengage said strips.

9. A mechanism for making material for multiple plastic bags with reclosable fasteners constructed in accordance with claim 6 and including slot means in said main anvil for guiding said strips to a position relative to said film.

10. A mechanism for making material for multiple bags with reclosable fasteners constructed in accordance with claim 8 and including adjustable fastener retaining guides receiving and guiding the strips.

11. A mechanism for making material for multiple plastic bags with reclosable fasteners constructed in accordance with claim 3 and including anvil means positioned opposite each of the sealing heads for continuous joining of the front fastener strips and the rear fastener strip.

12. A mechanism for making material for multiple plastic bags with reclosable fasteners constructed in accordance with claim 4 and including an anvil support positioned to extend between said edge portions.

13. A mechanism for making material for multiple plastic bags constructed in accordance with claim 3 and including slitting means in advance of the sealing heads for separating said edge portions.

14. A mechanism for making material for multiple plastic bags with reclosable fasteners thereon constructed in accordance with claim 11 wherein said anvil means has separate upper and lower sections with sound deadening insulating material between said sections.

* * * * *